United States Patent Office 3,288,032
Patented Nov. 29, 1966

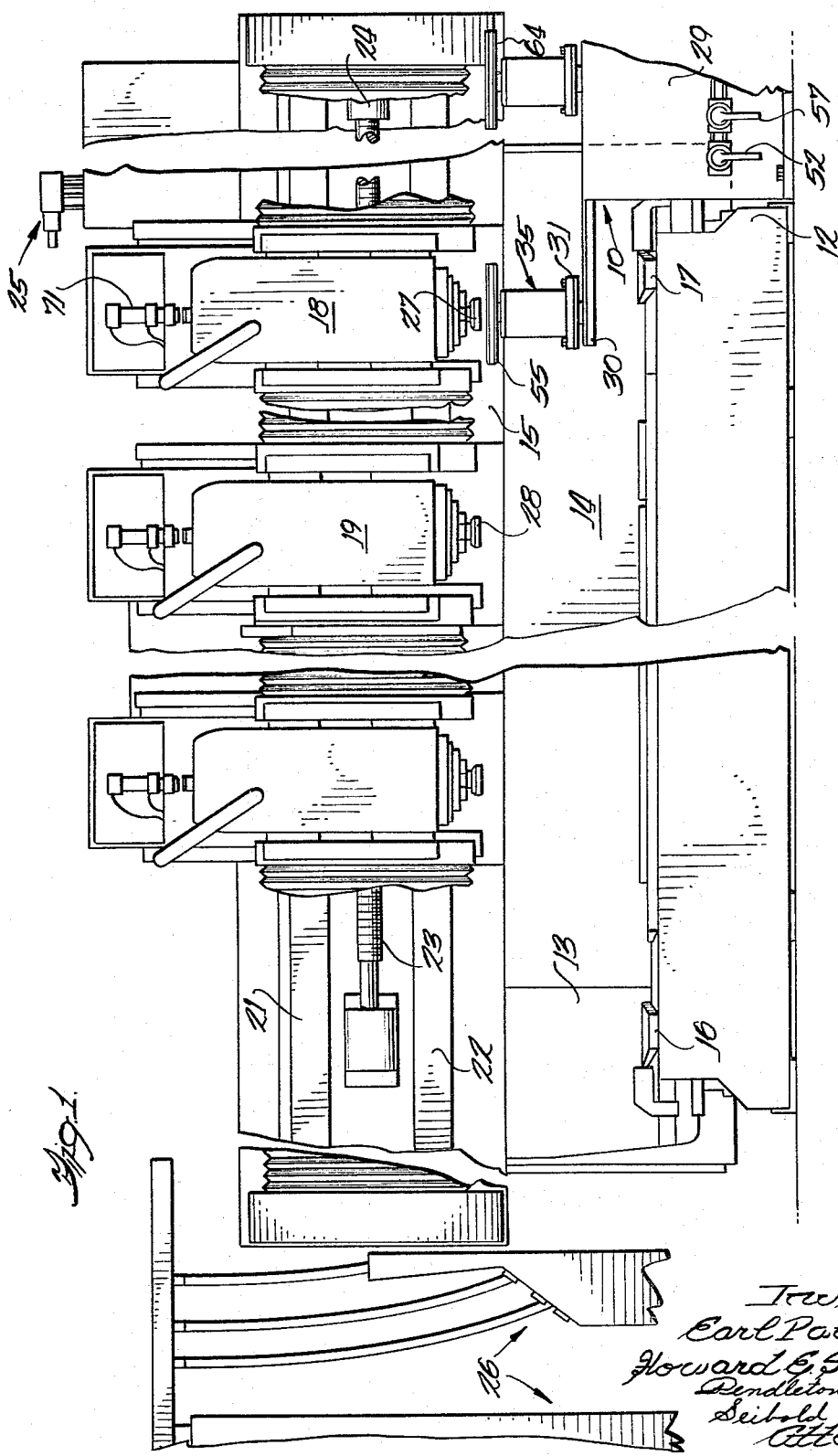

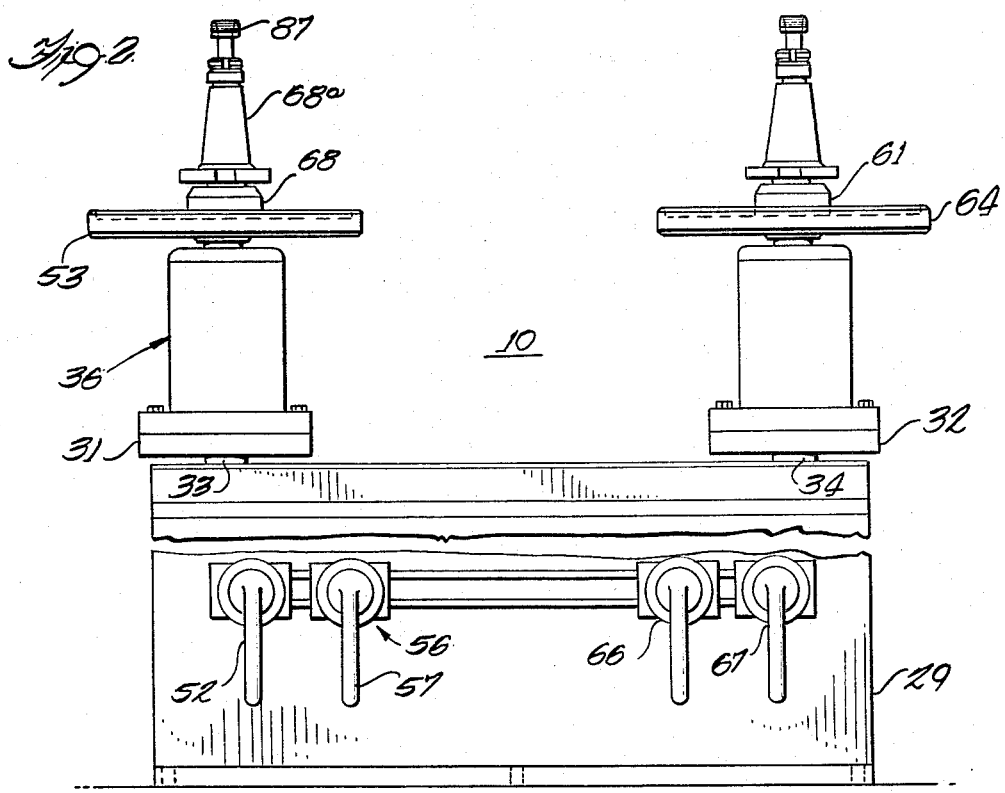
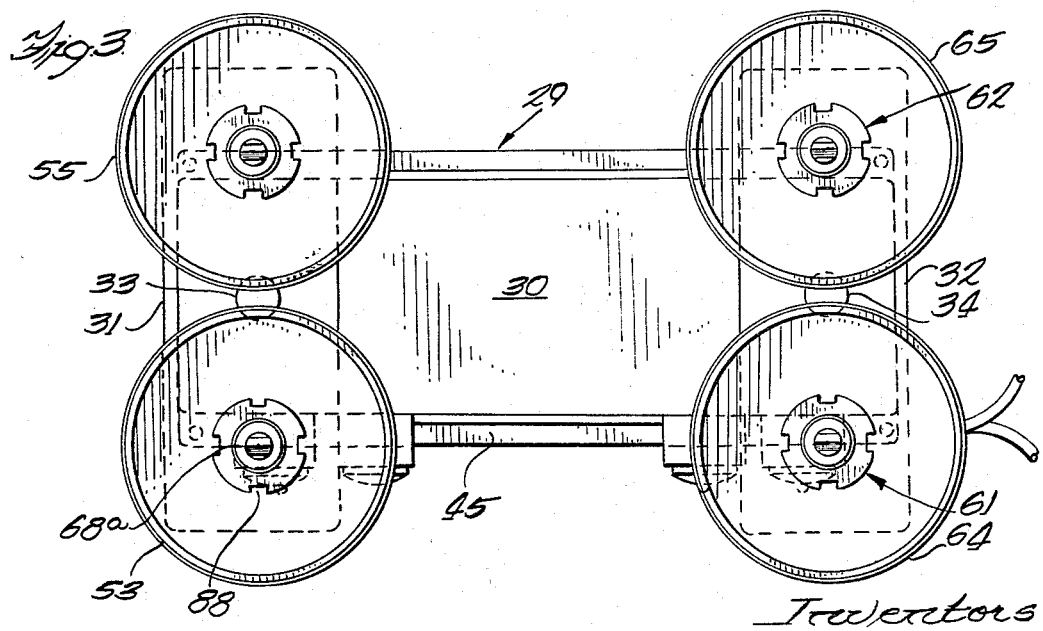

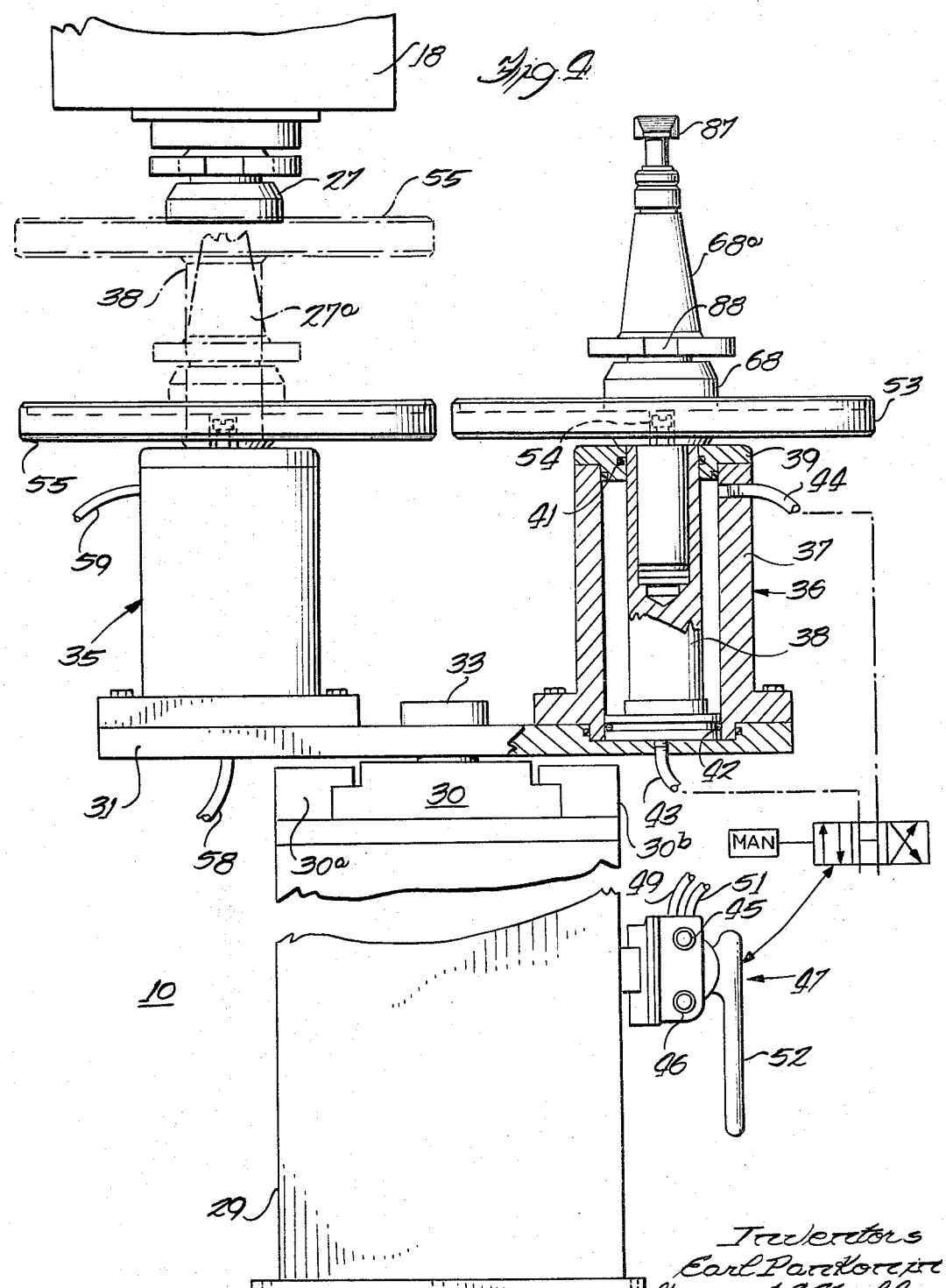

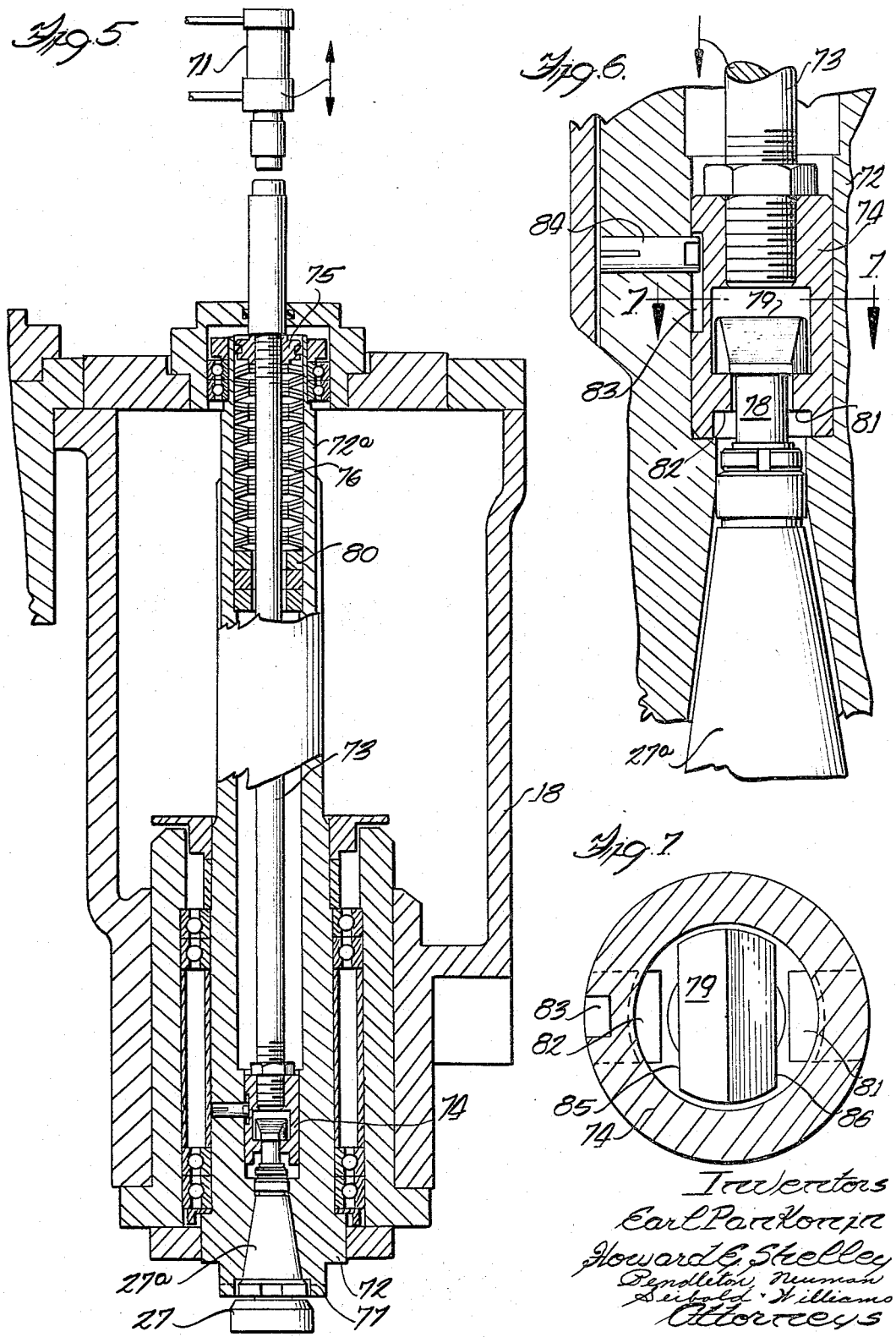

3,288,032
TOOL CHANGING APPARATUS FOR MILLING MACHINES AND THE LIKE
Earl Pankonin, Elmwood Park, and Howard E. Shelley, Skokie, Ill., assignors to Onsrud Machine Works, Inc., a corporation of Illinois
Filed Apr. 29, 1965, Ser. No. 451,802
5 Claims. (Cl. 90—11)

This invention relates to tool changing methods and apparatus for massive machine tools, for example, milling machines suitable for machining wing or fuselage panels of supersonic aircraft, and it is an object of the invention to provide improved tool changing apparatus of this character.

One form of milling machine to which the tool changing apparatus of this invention has application is known as a movable gantry milling machine in which the bed of the machine is stationary and the movable gantry comprises a carriage member on each side of the bed and a cross-rail supported by the carriage members. Such a milling machine suitable for milling airplane wing or fuselage panels or parts therefore, for example, may have a bed 15 or more feet in width and 75 or more feet in length. Moreover, such a machine may have several cutting heads mounted on the cross-rail for machining in more than one location at the same time.

Cutting tools on such multiple milling machines may be quite heavy and awkward to handhold in position while the necessary mechanical manipulations are made. In addition, the numerous cutting tools on a milling machine of the character indicated may require changing at the same time and this is a time consuming operation. Accordingly, it is an object of the invention to provide improved tool changing apparatus of the character indicated which is simple, efficient and labor saving.

It is a further object of the invention to provide improved tool changing apparatus of the character indicated which is adaptable for mounting on the machine bed, on the machine shop floor or on an adjacent table or platform and may be utilized with either moving bed or stationary bed machines or movable gantry machines.

Further objects of the invention will become apparent as the description proceeds.

In carrying out the invention in one form there is provided mechanism to facilitate the changing of tools in the tool operating head of a milling machine having a stationary machine bed, a carriage mounted on such bed and longitudinally movable relative thereto, such carriage including two members one each of which is movably disposed on each side of such bed, and a tool head carrying cross-rail mounted adjacent each end on one of such two members comprising a base member adapted to be fixedly located whereby such tool head carrying cross-rail may be disposed in tool changing position relative to said base member, a tool table movably mounted on said base member, fluid pressure means for raising and lowering said tool table for carrying tools into and out of attachment position, and valve means for controlling the application of fluid pressure to said fluid pressure means.

For a more complete understanding of the invention, reference should be had to the accompanying drawings, in which:

FIGURE 1 is a front elevational view of a massive milling machine and a tool changer according to the invention;

FIG. 2 is an end elevational view of the tool changing apparatus shown in FIG. 1;

FIG. 3 is a top plan view of the tool changing apparatus shown in FIG. 2;

FIG. 4 is a side elevational view on an enlarged scale of the tool changing apparatus shown in FIG. 2 and illustrating the operation thereof;

FIG. 5 is a fragmentary sectional view illustrating a manner of attaching tools useful with the tool changing apparatus according to the invention;

FIG. 6 is a fragmentary view similar to FIG. 5 with certain components in a different operating position; and FIG. 7 is a sectional view taken substantially in the direction of arrow 7—7 of FIG. 6.

Referring to the drawings the invention is shown as comprising tool changing apparatus 10 mounted on the bed of a movable gantry type milling machine 11.

The milling machine 11, as illustrated, comprises a stationary bed 12, a carriage consisting of two members 13 and 14 to each of which is attached a tool head carrying cross-rail 15. The cross-rail 15 and carriage members 13 and 14 move together on hardened guideways 16 and 17 as is well understood. A plurality of cutting tool holding and operating members, which may be referred to as tool heads 18 and 19, are shown, it being realized that more than two heads may be used. The heads 18 and 19 move transversely on hardened steel guides or ways 21 and 22, being caused to move together by a lead screw 23 driven by any suitable motor 24. Service lines for power, cooling, etc., are shown schematically by the reference character 25, and a carriage upon which an operator may ride for controlling the machine is shown schematically by the reference character 26.

The milling machine 11 is more completely described and claimed in the co-pending application Serial No. 440,813, filed March 18, 1965, Pankonin and Ohlig, and assigned to the same assignee as the present invention.

The job of changing cutting tools, for example, milling cutters 27 and 28, may be awkward and time consuming, and, it is to the solution of this problem that the apparatus and method of the invention are directed. Realizing that milling machines of the character involved may have as many as eight cutting heads, it becomes apparent that tool changing apparatus which is efficient, simple, and labor saving in nature, is of tremendous advantage in the efficient operation of the machine tool.

The tool changer 10, shown in FIG. 1 mounted alongside the machine, comprises a base member 29 upon which a pair of arms 31 and 32 are mounted on centrally disposed pivots 33 and 34 in turn disposed on a slide 30, the slide being held by guides 30a and 30b. Arranged at the ends of the arm 31, respectively, are tool raising and lowering mechanisms 35 and 36.

Referring more particularly to FIG. 4, the tool raising and lowering mechanism 36 is shown as comprising a hydraulic cylinder 37 within which is disposed a piston 38. The upper end of cylinder 37 is closed by a cap 39 which is sealed to the piston 38 by a gasket 41 and the lower end of piston 38 is sealed to the inside of cylinder 37 by an O ring gasket 42. The piston 38 is movable upwardly under the influence of fluid pressure, for example, hydraulic pressure admitted through conduit 43, and is movable downwardly under the influence of similar pressure adimitted through conduit 44. Hydraulic pressure and its relief, for example, are available through suitable conduits 45 and 46 controlled by a valve 47 for the particular cylinder 36. A schematic valve and pressure manifold are shown by the reference character 48 for controlling the manipulations of piston 38. Thus, movement of the valve handle 52 to one position will apply fluid pressure beneath piston 38 forcing it upwardly and at the same time an opening is provided through conduit 44 whereby pressure in the upper portion of the cylinder is relieved. When the piston reaches its uppermost position, the valve 47 is closed leaving the piston thereat. To lower the piston 38, the handle 52 is moved in the opposite direction thereby relieving pressure under the piston 38 through conduit 43 and applying pressure above the piston through conduit 44. The piston under this influence moves downwardly to its lowermost position. Attached to the upper end of piston 38 is a tool carrying table 53. The table 53 is rotatable about the piston axis, either by being pivotally mounted as by a screw 54, or the table 53 and the piston may rotate together.

The raising and lowering mechanism 35 (FIG. 4) is identical in construction to the raising and lowering mechanism 36, and includes a tool raising and lowering table 55 which may be raised or lowered by hydraulic pressure controlled as described through valve mechanism 56 including the valve handle 57. The raising pressure is applied through conduit 58 and the lowering pressure is applied through conduit 59.

At each end of arm 32, there are disposed fluid operated tool raising and lowering mechanisms 61 and 62 which are in all respects identical to the hydraulic mechanism 36, a tool table 64 being disposed at the upper end of hydraulic mechanism 61 and tool table 65 being disposed at the upper end of hydraulic mechanism 62. The hydraulic mechanisms 61 and 62 are controlled to raise and lower, respectively, the tables 64 and 65 through hydraulic pressure applied from the source already indicated as by valves 66 and 67. Thus, the tool changing mechanism, as described comprises a total of four tool raising and lowering mechanisms, whereby two tools may be removed from a milling machine and two new, for example, sharpened tools substituted in their place without reloading the tool changing device. A base with only four tool changing mechanisms, as described, is exemplary since six or more may be provided, if desired.

The operation of and additional structure for the apparatus according to the invention may be described by considering an example of operation. In such example, it will be considered that the tool changing mechanism 10 is disposed alongside the bed 12 of the milling machine 11, as shown in FIG. 1. It will also be assumed that the cross-rail 15, by automatic numerical control or otherwise, is disposed so that the tool 27 of head 18 is disposed centrally over table 55. The slide 30 will be pulled out so that head 18 disposes tool 27 directly over hydraulic mechanism 35. The head 18 also is raised or lowered to the appropriate position, by automatic numerical control or otherwise, having regard to the proper height of the tool table 55 for tool changing. If desired, head 18 may be moved sufficiently to be disposed over the hydraulic mechanism 62 while head 19 may be disposed over hydraulic mechanism 35.

The base 29 is, of course, firmly attached as by bolts alongside the bed 12. It is also assumed in this example of operation that it is desired to remove the dull tool 27 and to replace it with the sharpened tool 68.

In the initial condition of the tool changer 10, all of the tool tables 53, 55, 64 and 65 are in their lowered positions. And, considering only the tool head 18, the tool table 53 has a sharpened tool 68 disposed thereon and the tool table 55 has no tool disposed thereon (FIG. 4). The operator first manipulates valve handle 57 raising the tool table 55 to the position shown in dot-dash lines in FIG. 4. While in this position the cutting tool 27 is released from tool head 18 by application of pressure to cylinder 71, as will be subsequently described, and is disposed on tool table 55. Further manipulation of the valve handle 57 lowers the tool table 55 with the cutting tool 27 and its adapter 27a disposed thereon to the lowered position.

The next step is that of rotating the arm 31 counterclockwise thereby bringing the tool table 53 with cutting tool 68 and its adapter 68a disposed thereon into the position previously occupied by tool table 55. The conduits or hose 43, 44, 58 and 59 are flexible and will permit this movement of arm 31 and hydraulic mechanisms 35 and 36 as well as the in and out movements of slide 30. The operator now manipulates valve handle 52 to apply pressure through conduit 43, thereby raising the tool table 53 into the dot-dash line position formerly occupied by tool table 55. In this position the adapter 68a is disposed in its socket in tool head 18 and the tool table 53 is rotated about its vertical axis until the tool 68 is in its proper position, as will subsequently be described. Release of pressure in hydraulic cylinder 71 permits the tool 68 to be firmly attached to head 18. Further manipulation of the valve handle 52 releases the pressure in conduit 43 and applies pressure through conduit 44 thereby lowering tool table 53 to its lowermost position. The cutting tool 68 now disposed in head 18 is ready for further operation upon the work disposed on the machine bed 12.

The functions of tool tables 53 and 55, for example, are interchangeable and in subsequent tool changing operations the tool table 53 may be used for lowering the tool after removal from head 18 and tool table 55 may be used for moving the sharpened cutting tool into attachment position.

After the tools have been changed, the tool changer may be removed to any convenient place. The tool changer may, if desired, be suitably dimensioned to be disposed on the worktable of bed 12 or at the end thereof without departing from the spirit and scope of the invention.

While the manner of use of tool tables 53 and 55 has been described, it will be understood that tool tables 64 and 65 and their operating cylinders 61 and 62 function in like manner.

One manner of attaching cutting tools and their adapters to the cutting head 18, and, thus, to the other cutting heads, may be understood by referring to FIGS. 4, 5, 6 and 7. The cutting tool 27 is driven by armature 72 suitably supported in bearings as shown, the rotation of armature 72 being achieved in any desirable fashion as through hydraulic means or electrical means, not shown. The armature 72 is hollow and is supported at its upper end 72a in a bearing as shown. Interiorly of armature 72 there is a power draw bar 73 threadedly attached at its lower end to a sliding detent 74, the upper end of draw bar 73 being threadedly attached to a collar 75 against which one end of a coil leaf spring 76 bears. The other end of the coil leaf spring bears against a fixed abutment 80 inside of armature 72. In the unenergized position of hydraulic cylinder 71, the power draw bar 73 is at its upper position under the influence of spring 76 and holds tool 27 through its adapter 27a firmly in the receiving socket at the lower end of armature 72. The armature 72 includes a pair of lugs or keys 77 which are received in cooperating openings or slots in the lower end of adapter 27a for actually driving the adapter 27a and the attached tool 27.

The upper end of adapter 27a includes a narrow shank portion 78 terminating in a triangular shaped knob 79, the lower surface of which provides a shoulder against which bears the upper surfaces of protuberances 81 and 82 projecting inwardly from the interior of detent 74. The detent 74 is slidable inside of armature 72, the limits of which are prescribed by the dimensions of a slot 83 and a pin 84 which projects into the slot, as may be seen best in FIG. 6. In the position shown in FIG. 6, the knob 79 is in engagement with lugs 81 and 82 and the detent 74 is in its lowermost position which occurs when cylinder 71 is energized and forces the power draw bar 73 downwardly to its lowermost position. In this position, the adapter 27a may be rotated a quarter turn to the position shown by the knob 79 in FIG. 7, and the sides 85 and 86 are spaced away from the forward edges of lugs 81 and 82 permitting the knob 79 to move downwardly between lugs 81 and 82. Thus, the adapter 27a and its attached tool are removed.

When the new tool and its adapter, for example, adapter 68a, are to be placed in the tool head 18, the cutting tool 68 and adapter 68a are raised into position by the hydraulic tool raiser 36 and the knob 87 is so rotated that the sides thereof will move between the lugs 81 and 82, as shown in FIG. 6. After the lug 87 is received within the space above lugs 81 and 82, the tool table 53 is rotated about its vertical axis thereby rotating the adapter 68a so that the ends of knob 87 are disposed over the upper surface of lugs 81 and 82. In this same position the slots 88 of adapter 68a are in a position to receive lugs or keys 77. The de-energization of cylinder 71 permits the spring 76 to move the power draw bar upwardly thereby moving the sliding detent 74 upwardly by virtue of which the lugs 81 and 82 move the knob 87 upwardly to bring the slots 88 into interengagement with the lugs 77. The tool 68 is thereby held with its adapter 68a in the receiving socket and the apparatus is in condition to operate.

The process as described with one setting of tool changer 10 may be repeated to change the tool disposed on table 64.

While a particular embodiment of the invention has been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. Mechanism to facilitate the changing of tools in the tool operating head of a milling machine having a stationary machine bed, a carriage mounted on such bed and longitudinally movable relative thereto, such carriage including two members one each of which is movably disposed on each side of such bed, and a tool head carrying cross-rail mounted adjacent each end on one of such two members comprising a base member adapted to be fixedly located whereby such tool head carrying cross-rail may be disposed in tool changing position relative to said base member, a plurality of tool tables individually movably mounted on said base member, fluid pressure means for raising and lowering said tool tables for carrying tools into and out of attachment position, and valve means individual to each one of said plurality of tool tables for controlling the application of fluid pressure to said fluid pressure means.

2. Mechanism to facilitate the changing of tools in the tool operating head of a milling machine having a stationary machine bed, a carriage mounted on such bed and longitudinally movable relative thereto, such carriage including two members one each of which is movably disposed on each side of such bed, and a tool head carrying cross-rail mounted adjacent each end on one of such two members comprising a base member adapted to be fixedly located whereby such tool head carrying cross-rail may be disposed in tool changing position relative to said base member, an arm rotatably mounted at its center on said base member, a pair of tool tables one each of which is mounted on each end of said arm whereby each one of said pair of tool tables may alternately be disposed in and out of tool changing positions with respect to such tool head, fluid pressure means associated with each one of said tool tables for raising and lowering thereof for carrying tools into and out of attachment position, and valve means individual to each one of said tool tables for controlling the application of fluid pressure to the corresponding one of said fluid pressure means.

3. Mechanism to facilitate the changing of tools in the tool operating head of a milling machine having a stationary machine bed, a carriage mounted on such bed and longitudinally movable relative thereto, such carriage including two members one each of which is movably disposed on each side of such bed, and a tool head carrying cross-rail mounted adjacent each end on one of such two members comprising a base member adapted to be fixedly located whereby such tool head carrying cross-rail may be disposed in tool changing position relative to said base member, at least a pair of arms each centrally mounted on said base member, a series of tool tables one each of which is mounted on each end of each of said arms whereby each one of said tool tables may alternately be disposed in and out of a tool changing position with respect to a particular tool head, fluid pressure means associated with each one of said tool tables for raising and lowering thereof for carrying tools into and out of attachment position, and valve means individual to each one of said tool tables for controlling the application of fluid pressure to the corresponding one of said fluid pressure means.

4. Mechanism to facilitate the changing of tools in the tool operating head of a milling machine having a stationary machine bed, a carriage mounted on such bed and longitudinally movable relative thereto, such carriage including two members one each of which is movably disposed on each side of such bed, and a tool head carrying cross-rail mounted adjacent each end on one of such two members comprising a base member adapted to be fixedly located whereby such tool head carrying cross-rail may be disposed in tool changing position relative to said base member, an arm rotatably mounted at its center on said base member, a pair of tool tables one each of which is mounted on each end of said arm whereby each one of said pair of tool tables may alternately be disposed in and out of a tool changing position with respect to such tool head, each one of said tool tables being rotatable about its axis, fluid pressure means associated with each one of said tool tables for raising and lowering thereof for carrying tools into and out of attachment position, and valve means individual to each one of said tool tables for controlling the application of fluid pressure to the corresponding one of said fluid pressure means.

5. Mechanism to facilitate the changing of tools in the tool operating head of a milling machine having a stationary machine bed, a carriage mounted on such bed and longitudinally movable relative thereto, such carriage including two members one each of which is movably disposed on each side of such bed, and a tool head carrying cross-rail mounted adjacent each end on one of such two members comprising a base member adapted to be fixedly located whereby such tool head carrying cross-rail may be disposed in tool changing position relative to said base member, an arm rotatably mounted at its center on said base member whereby each end thereof may alternately be disposed in and out of a tool changing position with respect to such tool head, a hydraulic cylinder mounted on each end of said arm, a double acting piston disposed in each one of said hydraulic cylinders for raising and lowering movements, a tool table rotatably mounted on each of said pistons for carrying tools into and out of attachment positions by virtue of said movements of said pistons, a source of hydraulic pressure, conduits for transmitting and relieving hydraulic pressure relative to each side of said pistons in said cylinders, and valve means individual to each of said cylinders for controlling said transmission and relieving of hydraulic pressure.

References Cited by the Examiner

UNITED STATES PATENTS 3,028,770  4/1962  Pittwood _____ 29—26
3,052,011  9/1962  Brainard et al. _____ 77—4

WILLIAM W. DYER, Jr., *Primary Examiner.*

G. A. DOST, *Assistant Examiner.*